United States Patent [19]

Yamamichi et al.

[11] Patent Number: 5,041,858

[45] Date of Patent: Aug. 20, 1991

[54] MOUNT DEVICE

[75] Inventors: Masayoshi Yamamichi, Kanagawa; Masahisa Fujino, Tokyo, both of Japan

[73] Assignee: Canon Kabushiki Kaisha, Tokyo, Japan

[21] Appl. No.: 617,375

[22] Filed: Nov. 21, 1990

Related U.S. Application Data

[63] Continuation of Ser. No. 364,589, Jun. 12, 1989, abandoned, which is a continuation of Ser. No. 253,921, Oct. 6, 1988, abandoned, which is a continuation of Ser. No. 14,021, Feb. 12, 1987, abandoned.

[30] Foreign Application Priority Data

Feb. 17, 1986 [JP] Japan .................................. 61-21417
Feb. 17, 1986 [JP] Japan .................................. 61-21418

[51] Int. Cl.$^5$ ............................................. G03B 17/14
[52] U.S. Cl. ...................................................... 354/286
[58] Field of Search .......................................... 354/286

[56] References Cited

U.S. PATENT DOCUMENTS

| | | | |
|---|---|---|---|
| 3,940,777 | 2/1976 | Komine | 354/197 |
| 4,104,649 | 8/1978 | Tanaka et al. | 354/286 X |
| 4,448,509 | 5/1984 | Katsuma et al. | 354/286 |
| 4,457,609 | 7/1984 | Tomino et al. | 354/286 |
| 4,464,034 | 8/1984 | Tomino | 354/286 |
| 4,527,879 | 7/1985 | Hosoe et al. | 354/286 X |
| 4,536,071 | 8/1985 | Maekawa et al. | 354/400 |
| 4,596,454 | 6/1986 | Kawai et al. | 354/286 |
| 4,603,955 | 8/1986 | Haneishi | 354/286 |

FOREIGN PATENT DOCUMENTS

| | | |
|---|---|---|
| 54-108628 | 8/1979 | Japan . |
| 56-60911 | 5/1981 | Japan . |
| 58-72132 | 4/1983 | Japan . |
| 58-83824 | 5/1983 | Japan . |
| 59-42527 | 3/1984 | Japan . |
| 59-152424 | 8/1984 | Japan . |
| 59-218412 | 12/1984 | Japan . |
| 60-23841 | 2/1985 | Japan . |
| 60-53912 | 3/1985 | Japan . |
| 2078384 | 1/1982 | United Kingdom . |
| 2158957 | 11/1985 | United Kingdom . |

OTHER PUBLICATIONS

Rolleiflex SLX, Blueprints #566000412B1, (1974) and 5500143001 (Planar 28180) (1973).

Pliot Argus No. 83, Nov. 1977, "Le Rolleiflex SLX".

Photographic Industries, 2, '77, "Rolle; Relfex SLX", Feb. 1977.

Photographic Industries, 10, '82, "Mamiya RZ 67 Professional", Oct., 1982.

*Primary Examiner*—Michael L. Gellner
*Attorney, Agent, or Firm*—Fitzpatrick, Cella, Harper & Scinto

[57] ABSTRACT

A mount device for an interchangeable lens having a bayonet type mount member capable, upon rotation relative to a mount member on a camera body, of coupling with or decoupling from the latter, and a plurality of electrical connection terminals arranged, upon completion of a coupling operation of both mount members, to contact with the equal number of electrical connection terminals on the camera body so that communication become possible between the lens and the camera body. The axial rear ends of the terminals on the lens project outwardly from the rear end surface of the mount member on the lens and the rear end surface of the rearmost lens.

18 Claims, 4 Drawing Sheets

MOUNT DEVICE

This application is a continuation of U.S. application Ser. No. 07/364,589 filed on June 12, 1989, which is a continuation of U.S. application Ser. No. 07/253,921 filed on Oct. 6, 1988, which is a continuation of U.S. application Ser. No. 07/014,021, filed on Feb. 12, 1987, all abandoned.

BACKGROUND OF THE INVENTION

1. Field of the Invention

This invention relates to a mount device in camera.

2. Description of the Related Art

As the means of releasably attaching a lens to a camera body, use is made of the rotate-to-couple or -decouple type bayonet mount in which the complete camera is set up or taken down by turning the camera body and the lens at their respective coupling flanges clockwise or counter-clockwise relative to each other.

In the vicinity of that mount there is a location member for determining the angular position of the lens relative to the camera body at the end of coupling with locking means therefor. Also provided are a wide variety of members for transmitting or receiving mechanical signals and electrical signals between the camera body and the lens, lens. For example the driving power transmission is transmitted from the inside of the camera body to the operating mechanism for the diaphragm in the lens barrel. Also, the operative connections from a diaphragm position detector and a full-open aperture sensor to the exposure control apparatus in the camera body are arranged in highly concentrated relation. Hence, the narrow space between the lens mount and the mirror box is filled with a very intricate pattern of these members.

Moreover, in recent years, along with the development of cameras having an ever higher degree of automation, the necessary number of members as such is liable to further increase. As the additional members have to take their places near the aforesaid transmission, the greater the number of members arranged adjacent the lens mount, the poorer the compatibility with the old types of lenses becomes. Even for assuring maintenance of sufficient compatibility, the design of the lens mount and its peripheral members is becoming more important.

Under such a situation, for, as the capabilities of the camera have recently been broadened to include autofocus with the necessity of electrically transmitting and receiving much information between the camera body and the lens, designers are planning to replace some of the conventional mechanical connections by electrical connections with the advantage of utilizing the interconnection terminals for the AF system in common with those for the diaphragm control device or the like. This makes more important the functions of the electrical interconnections. So, the arrangement and construction of the terminals for the aforesaid interconnections on the lens mount has come to largely affect the fidelity of automation in the camera.

SUMMARY OF THE INVENTION

It is, therefore, an object of the invention to provide a mount device which assures that when the lens is being attached to the camera body, all of the many members arranged in the vicinity of the mount members can never interfere with, or be damaged by, one another.

BRIEF DESCRIPTION OF THE DRAWINGS

FIG. 4 is a fragmentary sectional view of the same lens when it stands alone with its mount on a desk, or the like.

DETAILED DESCRIPTION OF THE PREFERRED EMBODIMENT

The present invention is next described in connection with an embodiment thereof by reference to the drawings.

The following embodiment is an example of application of the invention to the camera having the rotate-to-couple or -decouple type bayonet mount in which the mount on the lens is first placed into axial and angular registry with the mount on the camera body and then turned to one direction, or vice versa, when they are being coupled with, or decoupled from, each other, respectively.

Figure 1:
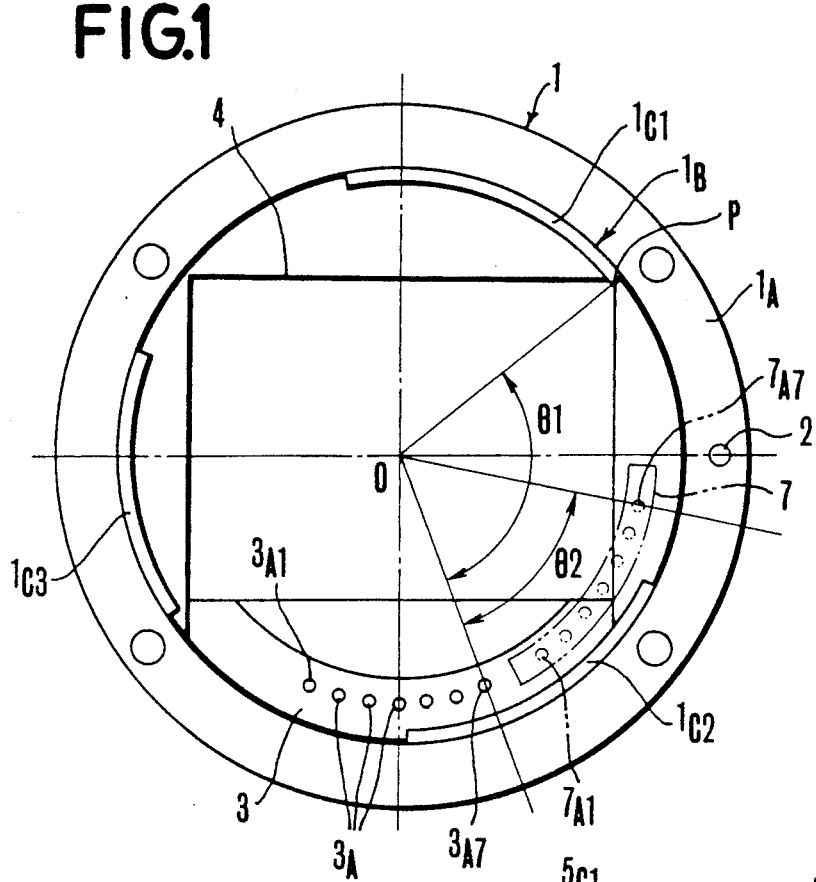
FIG. 1 is an elevational view from the front of the camera of an embodiment of a mount on the camera body according to the present invention.
Figure 2:
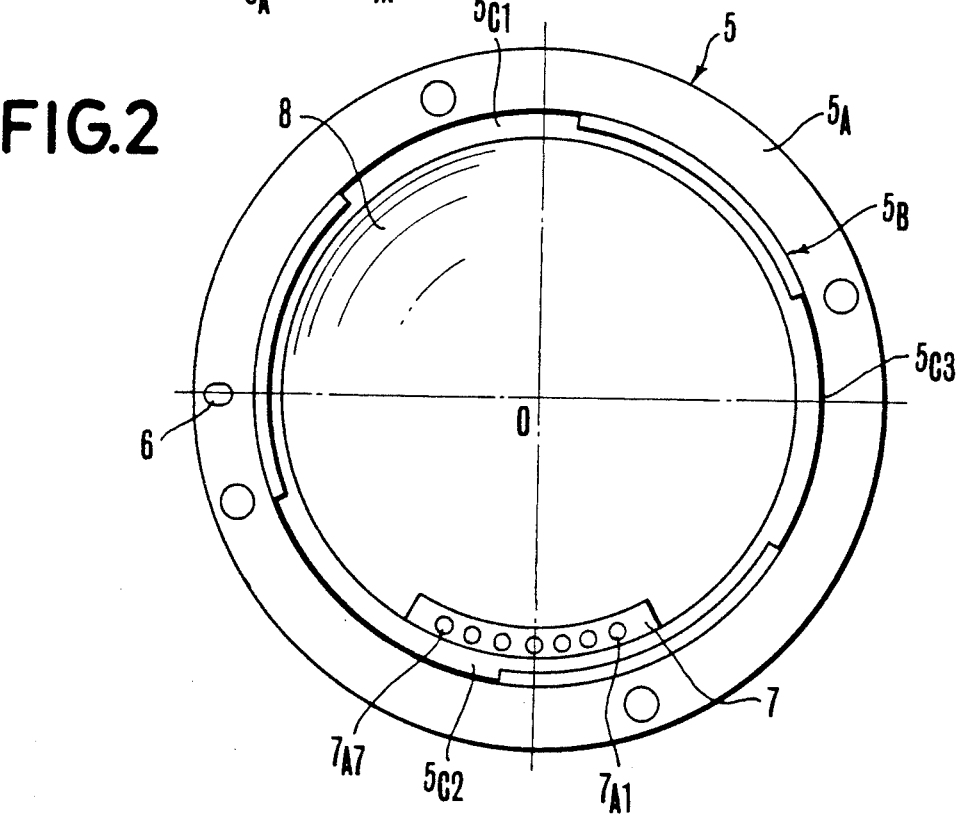
FIG. 2 is an elevational view from the back of the same camera of a mount on the lens thereof.
Figure 5:
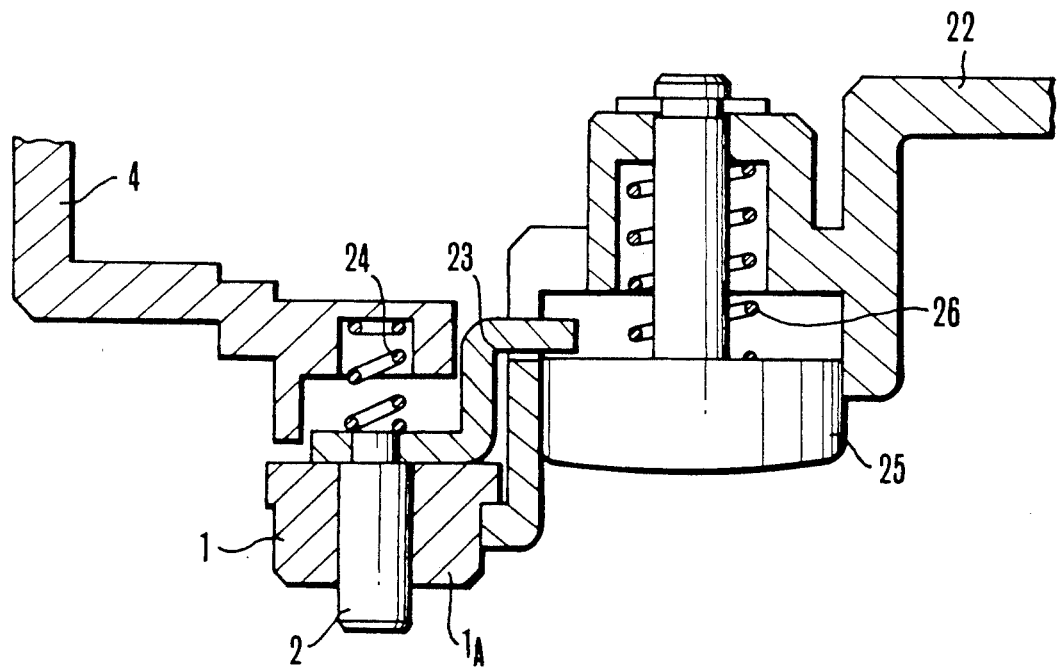
FIG. 5 is a fragmentary sectional view in greatly exaggerated scale illustrating the details of the location mechanism of FIG. 1.

As shown in FIG. 1, the mount 1 on the camera body comprises an abutment surface 1A of annular shape with its center at an optical axis O. Three pawls $1C_1$, $1C_2$ and $1C_3$ are formed along the inner periphery of the abutment surface 1A in equally spaced relation. FIG. 1 shows that state of the mount 1 of the camera body which is looked from the front of the camera. In this figure, a mount lock pin 2 is arranged in the abutment surface 1A on the horizontal diagonal line at the center of the width of the right hand side portion thereof. The tip of this pin 2 is urged to project forwardly of the abutment surface 1A by a spring 24 positioned in a proper recess of a wall member of a mirror box 4 as shown in FIG. 5. When the coupling is complete, the pin 2 enters a detent oval groove 6 formed in a mount 5 on the lens. To decouple, the operator will push a lock release button 25 against the bias force of a spring 26 toward the front panel 22 of the camera housing. Such inward movement of the button 25 causes the mount lock pin 2 to be retracted from the abutment surface 1A (toward the above in FIG. 5) through a lever 23 which is fixedly secured to the pin 2. Thus, the mount 5 is released from the locking. This mount 5 also has an abutment surface 5A of the same annular shape as the abutment surface 1A with its center at the optical axis O as shown in FIG. 2. Three pawls $5C_1$, $5C_2$ and $5C_3$ are formed along the inner periphery of the abutment surface 5A in equally spaced relation and arranged to engage with the pawls $1C_1$, $1C_2$ and $1C_3$ of the mount 1 of the camera body respectively when they are rotated about the optical axis O. FIG. 2 shows the completely coupled state of the mount 5 on the lens with the mount 1 on the camera body as viewed from behind the rear end of the lens. In this figure, the detent groove 6 for the mount lock pin 2 is cut in the abutment surface 5A on the horizontal diagonal line at a point almost coincident with the center of the width of the left hand (if viewed from the front of the camera, right hand) side portion thereof.

Inwardly of the central one third of the lower half of each of the mounts 1 and 5 is projected a concentrically arcuate base plate 3 or 7 respectively, on which a plurality of, in this instance, seven, electrical connection terminals 3A or 7A are arrayed in an arcuate row. These terminals 3A and 7A are arranged to contact with each other in paired relation when the coupling is complete. The functions of these paired terminals 3A and 7A are to transmit or receive various electrical signals between the circuitries of the camera body and the lens. For example, electrical power from a battery in the camera body is supplied to the lens therethrough, and information representing the F-number at full open aperture and the focal length of the individual lens from a memory in the form of ROM are brought into a central processing unit (CPU) in the camera body therethrough.

Figure 3:
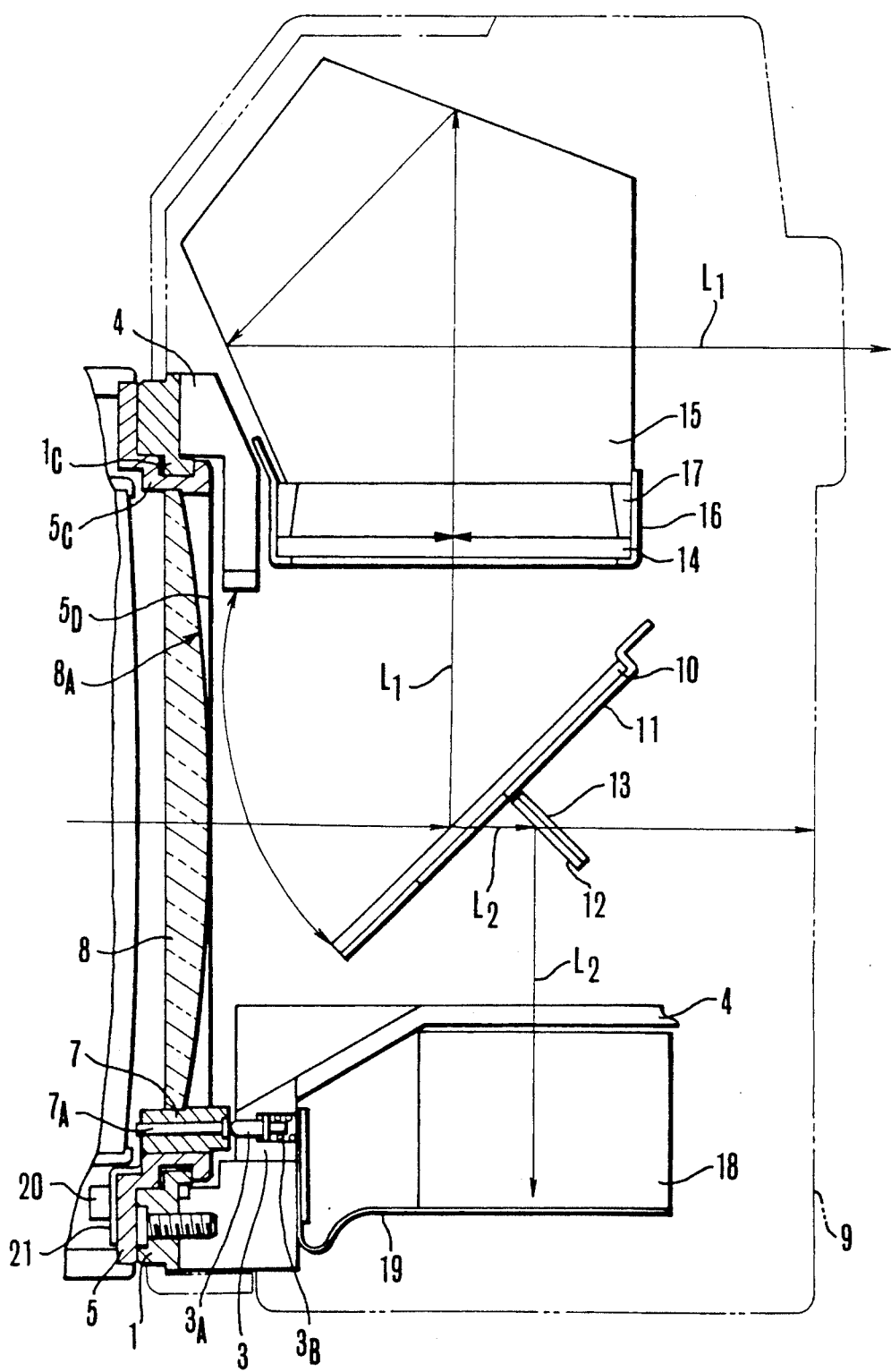
FIG. 3 is a side sectional view of the same camera with its central portion shown in detail.

In FIGS. 1 and 2, the base plates 3 and 7 carrying the respective sets of terminals 3A and 7A are formed in a similar shape to each other, and their sizes are limited to within the cross-section of a space between each abutment surface 1A, 5A and the bottom plane of the mirror box 4 of rectangular cross-section. This allows for easily assuring the admitting of an effective light beam. Also, since, as shown in FIG. 3, an AF unit 18 (including light sensor and control circuits) usually occupies a space between the mirror box and the bottom panel of the camera body 9, and because it has deep connections with the terminals 3A, it is desirable to use a flexible printed circuit board 19, which permits an electrical connection therebetween to be easily established without having to interfere with other members. It should be pointed out that in each of the aforesaid sets of terminals 3A and 7A, the size of each terminal and the distance between the adjacent two of the terminals are so determined that when in coupling, the tolerances for the dimensions of the mounts do not result in breaking the contact with each pair of terminals 3A and 7A, or a cross-talk between the adjacent pairs of terminals.

Figure 6:
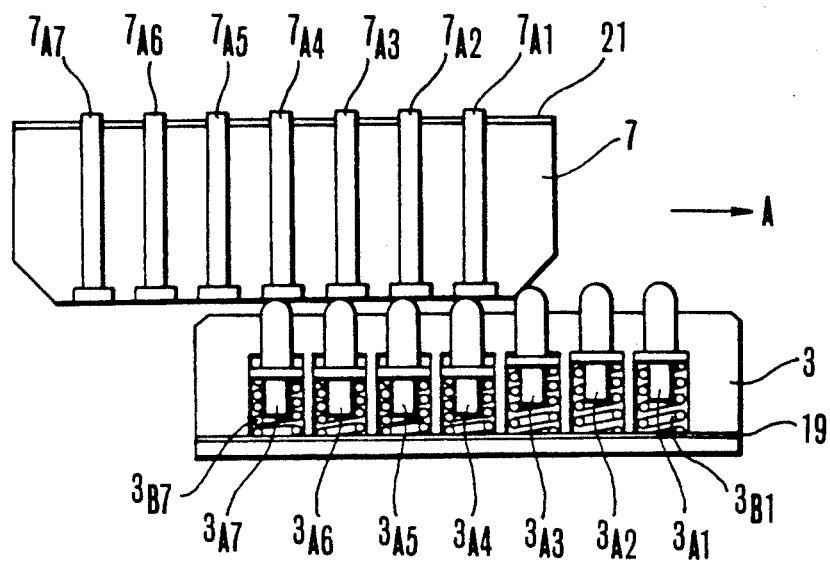
FIG. 6 is a partly elevational partly sectional view of two sets of connection terminals at an intermediate point during the rotation of the lens relative to the camera body.
Figure 7:
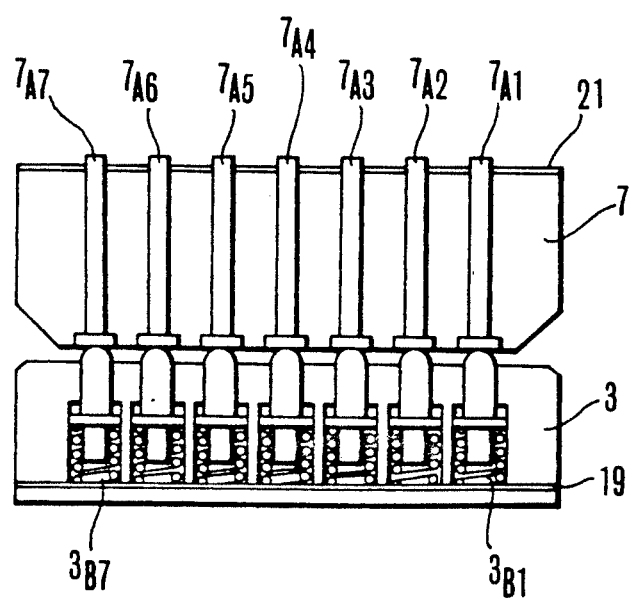
FIG. 7 is similar to FIG. 6 except that is shows the end of rotation of the lens.

Next referring to FIGS. 6 and 7, the structure of construction of each terminal carrier is described.

FIG. 6 is a sectional view illustrating an intermediate operative position of the mount device of the invention. Concerning the mount on the camera body, all the seven terminals $3A_1$ to $3A_7$ are formed in a pin-like similar shape to one another, and each has a semi-spherical head and a collar at almost the center of the length thereof. The upper portion above the collar is movably fitted in a hole formed in the base plate 3 of electrically insulating material and the collar also in a over-bored hole. Compression springs $3B_1$ to $3B_7$ between the respective collars of the pins $3A_1$ to $3A_7$ and respective lead patches of the circuits printed on the board 19 urge the terminals $3A_1$ to $3A_7$ to be pushed upward as viewed in FIG. 6. As a result, the tips of the terminals $3A_1$ to $3A_7$ are projected outwardly of the outer surface of the base plate 3 to a longer length than the distance between the base plates 3 and 7. For the lens, on the other hand, the terminals $7A_1$ to $7A_7$ of pin-like similar shape, each with a larger diameter portion at the bottom end thereof, are buried in the electrically insulating base plate 7. The tops of all the terminals $7A_1$ to $7A_7$ are electrically connected to respective lead patches of circuits printed on a flexible printed circuit board 21. Both leading and trailing end corners of the terminal base plate 7 are cut off to form slant surfaces so that the contact resistance against the terminals $3A_1$ to $3A_7$ is reduced. When the lens side terminal base plate 7 moves in a direction indicated by arrow A from the position of FIG. 6, the leading slant surface pushes down the terminals $3A_3$ to $3A_1$ successively against the springs $3B_3$ to $3B_1$, finally reaching the position of FIG. 7 in which the coupling is complete. In this position, the upper and lower terminals $7A_1$ to $7A_7$ and $3A_1$ to $3A_7$ in each pair are axially aligned with each other to permit establishment of channels for signal transmissions therebetween with high accuracy and reliability. Since, at this time, the mount lock pin 2 engages in the detent groove 6 as has been described above, the once-established channels are maintained against breaking or cross-talk.

In FIG. 3, the camera body 9 shown by a 2-dot-and-1-dash line contains a main mirror 10 whose central portion is half-mirrored. The reflected light beam $L_1$ goes upward to a focusing screen 14 and therefrom through a pentagonal roof type prism 15 to an eyepiece (not shown). Meanwhile, the split-off light beam L2 is reflected by a submirror 12 downwardly past a hole provided in the bottom of the mirror box 4 to the AF unit 18. The main mirror 10 is supported on a bracket 11, and the submirror 12 on a plate 13. The focusing screen 14 is mounted on a framework 16 and is spaced apart from the prism 15 by a spacer 17.

Figure 4:
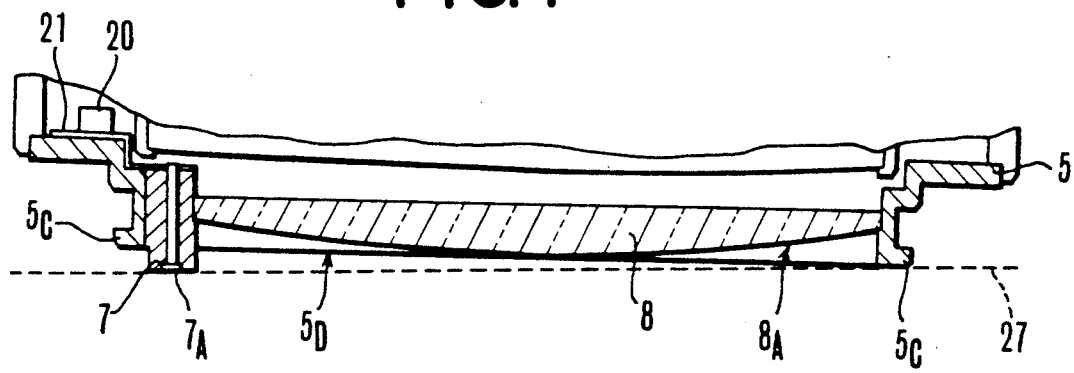

It should be pointed out here that an annular ferrule having the pawls 5C formed on the outer surface thereof and which also serves as a holder for the rearmost lens member 8 protrudes rearwardly (toward the camera body 9 or a film plane) of a plane defined by the abutment surface 5A of the mount 5 to a considerable length, and that the axially rear end face of the terminal base plate 7, or the confront end surfaces of the terminals 7A, also protrudes rearwardly of a plane 5D defined by the rear end of the annular ferrule to an appreciable length. When in the coupled position shown in FIG. 3, the pawls 1C on the camera body side mount 1 and the pawls 5C on the lens side mount 5 engage each other, and, at the same time, the camera body side terminals 3A are in contact with the lens side ones 7A. The lens barrel contains a circuit element assembly 20 including a CPU having a ROM built therein. The circuit elements are connected to the respective terminals 7A through a common flexible printed circuit board 21. The length the terminal base plate 7 protrudes outwardly of the plane 5D is so high that, as the rear vertex 8A of the lens lies inside the plane 5D, even when the lens decoupled from the camera body slands on the mount as shown in FIG. 4, the rear surface 8A of the lens will never come into contact with the rough surface 27 of a desk or the like, thus being protected from damages such as scratches. Further, since such protrusion of the lens side terminals 7A permits the camera body side terminals 3A to be positioned inwardly of a plane in which the pawls 5C move when the lens is coupled with the camera body, there is no possibility of the pawls 5c damaging the camera body side terminals 3A.

Returning to FIG. 1, another feature of the invention is described in connection with the process for coupling the lens with the camera body. The lens is first put on the camera body in axial alignment at such an angular position that the lens side mount pawl $5C_3$ takes its place in between the camera body side mount pawls $1C_2$ and $1C_3$ (the pawl $5C_2$ in between the pawls $1C_1$ and $1C_2$). In this state, the lens side terminal base plate 7 is located at the starting end of clockwise movement shown by a 2-dot-and-1-dash line. The distance between the counter-clockwise-most electrical connection terminals $7A_7$ and $3A_7$ on the lens and the camera body subtends an angle $\theta_2$ at the optical axis O (hereinafter called the "coupling" angle), while the distance from a point P at which the line on the right hand side of the mirror box 4 intersects the inner curvature of the pawl $1C_1$ to the coupling start side terminal $3A_7$ subtends an angle $\theta_1$. With the help of this geometry, the invention sets forth a rule of design: $\theta_1 > \theta_2$. When this condition is satisfied, the coupling rotation can be performed without suffering any mechanical interference between the lens side terminal base plate 7 and the mirror box 4 or the mirror 10, despite the projecting outwardly of the rear end 5D of the annular ferrule into the back space of a vertical plane falling from the front side of the top wall of the mirror box 4. This makes it possible to determine the maximum length of the mirror 10 by taking into account only the rear end 5D of the annular ferrule and the rear vertex 8A of the lens.

The above-described embodiment of the invention has the following advantages:

(1) Because the confronting surfaces of the electrical connection terminals between the lens and camera body are made axially positioned on the back side of the rear end of the mount on the lens, there is no possibility of occurrence of accidents such as the scratching of the electrical connection terminals on the camera body by the mount pawl on the lens and the electrical damage by abnormal contact.

(2) Even when the interchangeable lens slands alone on the ferrule, the rearmost surface of the lens is not damaged, for the base plate carrying the electrical connection terminals of the mount on the lens serves as a protecting leg.

(3) Because the electrical connection terminals are arranged below the bottom wall of the mirror box, it is easy to assure the full diameter of the effective light beam. Also, since the AF unit that always necessitates communications across the lens mount is usually installed on the bottom panel of the camera housing, because the use of a flexible printed circuit board is made to suffice for connecting the AF unit to the interconnection terminals, it is easy to avoid any electrical interference between the AF circuit and the other circuits. Further, this allows of creation of a spare space, leading to increase the degree of freedom of the design of the electrical connection terminals.

(4) Because the maximum acceptable range of rotation of the mount device is so determined that when coupling, the electrical connection terminals of the mount on the lens though projecting outwardly of the rear end of the flange member thereof do not enter the path of movement of the front edge of the mirror, the mirror can be designed in such a way that, while the presence of the electrical connection terminals being neglected, only the axial length of the annular ferrule and the rear vertex of the lens are factored into the length of the mirror. This leads to minimize the shortcut shade of the mirror.

(5) Because, differing from the conventional devices, it is in the upper half of the mount device that there is no interconnection members between the lens and the camera body, the focusing screen may be extended frontward up to the rear end of the lens mount device. This leads to facilitate an increase of the view area compared to the film area. If this percentage is left unchanged from the conventional value, the flange back can be made shorter than that when an interconnection member is arranged in the space between the top wall of the mirror box and the flange member of the mount device. Even for a case where use of the high relative aperture lenses is considered, the diameter of the mount device can be reduced. This leads to a more compact camera.

(6) Because there is no possibility of the occurrence of accidental contact of the electrical connection terminals on the camera body with the rearmost surface of the lens at any station during the coupling operation, it is possible to design a lens of increased relative aperture in the form that the clear-to-blank edge zone of the rearmost lens member is cut out in a corresponding portion to the assembly of electrical connection terminals. Hence, a lens of higher relative aperture with a shorter back focal length can be designed in view of the more compact mount device.

What is claimed is:

1. A bayonet-mount type optical accessory mountable on a camera body having a plurality of electrically connecting terminals arranged around, but below, an optical axis of the camera, a mirror which reflects light from an object to a finder optical system, and a mount having a lock member and a mount pawl thereon, wherein the optical accessory comprises:

a mount comprising a mount pawl engageable and disengageable by rotation around the optical axis with the mount pawl of the camera body;

a plurality of electrically connecting terminals arranged to engage the electrically connecting terminals of the camera body in the direction of the optical axis when said mount of the optical accessory is rotated around the optical axis to engage with the mount of the camera body so that the plurality of electrically connecting terminals of the optical accessory are located below the optical axis when the engagement of both mounts is completed, and wherein connecting portions of said electrically connecting terminals of the optical accessory are positioned behind said mount pawl of the optical accessory in the direction of the optical axis, said plurality of electrically connecting terminals being spaced from an abutment surface of said optical accessory mount and said mount pawl toward the optical axis and formed in a circumferential line with respect to the optical axis;

said optical accessory mount including a receiving portion for receiving the camera mount lock member upon completion of coupling between the optical accessory connecting terminals and the camera body connecting terminals, said receiving portion being located substantially 90° around the optical axis from a central portion of said optical accessory connecting terminals;

a terminal base member formed in the shape of a circular arc and arranged along the inner circumference of said optical accessory mount;

wherein said plurality of electrically connecting terminals of the optical accessory are supported by said terminal base member, and wherein an end portion of said terminal base member is located behind said mount pawl of the optical accessory in the direction of the optical axis.

2. An optical accessory according to claim 1 wherein the camera further comprises a rectangular mirror box, and wherein said electrically connecting terminals of the optical accessory are, when the optical accessory is engaged with the camera body, located outside of a rectangular picture frame of the rectangular mirror box of the camera body.

3. An optical accessory according to claim 1, wherein the optical accessory comprises an interchangeable lens.

4. An optical accessory according to claim 1, wherein said plurality of electrically connecting terminals of the optical accessory are fixed in the optical accessory.

5. An optical accessory according to claim 1, wherein a rear corner of said terminal base member has a tapered surface.

6. An optical accessory according to claim 1, wherein said end portion of said terminal base member and said connecting portions of said optical accessory electrically connecting terminals are aligned substantially in the same plane.

7. An optical accessory according to claim 6, wherein a rear corner of said terminal base member has a tapered surface.

8. An optical accessory according to claim 7, wherein said plurality of electrically connecting terminals of the optical accessory are fixed in the optical accessory.

9. A bayonet-mount type optical accessory mountable on a camera body having a plurality of electrically connecting terminals arranged around, but below, an optical axis of the camera, a mirror which reflects light from an object to a finder optical system, and a mount having a lock member and a mount pawl thereon, wherein the optical accessory comprises:
  a mount comprising a mount pawl engageable and disengageable by rotation around the optical axis with the mount pawl of the camera body;
  a plurality of electrically connecting terminals arranged to engage the electrically connecting terminals of the camera body in the direction of the optical axis when said mount of the optical accessory rotates around the optical axis to engage with the mount of the camera body so that the plurality of electrically connecting terminals of the optical accessory are located below the optical axis when the engagement of both mounts is completed, and wherein connecting portions of said electrically connecting terminals of the optical accessory are positioned behind said mount pawl of the optical accessory in the direction of the optical axis, said plurality of electrically connecting terminals being spaced from an abutment surface of said optical accessory mount toward the optical axis and formed in a circumferential line with respect to the optical axis;
  said optical accessory mount including a receiving portion for receiving the camera mount lock member upon completion of coupling between said optical accessory electrically connecting terminals and said camera body electrically connecting terminals, said receiving portion being located substantially 90° around the optical axis from a central portion of said optical accessory connecting terminals, wherein said plurality of electrically connecting terminals are disposed at a position such that $\theta 1$ is greater than $\theta 2$, wherein $\theta 1$ is an angle between a counterclockwise-most terminal when the optical accessory is mounted on the camera and a point P at which a camera mirror box intersects an inner curvature of the camera mount pawl, and where $\theta 2$ is an angle between the counterclockwise-most terminal before the optical accessory is rotated and after the optical accessory is rotated for mounting; and
  a terminal base member, wherein said plurality of electrically connecting terminals of the optical accessory are supported by said terminal base member, and wherein an end portion of said terminal base member is located behind said mount pawl of the optical accessory in the direction of the optical axis.

10. A camera comprising:
  a camera body having a plurality of electrically connecting terminals arranged around, but below, an optical axis of the camera, and a mount having a locking member and mount pawl thereon; and
  a bayonet-mount type optical accessory mountable on said camera body, wherein the camera comprises:
    a mount having a mount pawl engageable and disengageable by rotation around the optical axis with said mount pawl of said camera body;
    a plurality of electrically connecting terminals arranged around, but below, the optical axis of said camera to engage said electrically connecting terminals of said camera body in the direction of the optical axis when said mount of the optical accessory is rotated around the optical axis to engage with said mount of said camera body so that said plurality of electrically connecting terminals of said optical accessory are located below the optical axis when the engagement of both mounts is completed, and wherein connecting portions of said electrically connecting terminals of said optical accessory are positioned behind said mount pawl of the optical accessory in the direction of the optical axis, said plurality of electrically connecting terminals of said optical accessory being spaced from an abutment surface of said optical accessory mount and said mount pawl of said optical accessory toward the optical axis and formed in a circumferential line with respect to the optical axis;
    said optical accessory mount including a receiving portion for receiving said camera mount lock member upon completion of coupling between said optical accessory connecting terminals and said camera body connecting terminals, said receiving portion being located substantially 90° around the optical axis from a central portion of said optical accessory connecting terminals;
    a terminal base member formed in the shape of a circular arc and arranged along the inner circumference of said optical accessory mount;
    wherein said plurality of electrically connecting terminals of the optical accessory are supported by said terminal base member, and wherein an end portion of said terminal base member is located behind said mount pawl of the optical accessory in the direction of the optical axis.

11. A camera according to claim 10 wherein said camera body further comprises a rectangular mirror box, and wherein said electrically connecting terminals of said optical accessory are, when said optical accessory is engaged with said camera body, located outside of a rectangular picture frame of said rectangular mirror box of said camera body.

12. A camera according to claim 10, wherein said optical accessory comprises an interchangeable lens.

13. A camera according to claim 10, wherein said plurality of electrically connecting terminals of said optical accessory are fixed in said optical accessory.

14. A camera according to claim 10, wherein a rear corner of said terminal base member has a tapered surface.

15. A camera according to claim 10, wherein said end portion of said terminal base member and said connecting portions of said optical accessory electrically connecting terminals are aligned substantially in the same plane.

16. A camera according to claim 15, wherein a rear corner of said terminal base member has a tapered surface.

17. A camera according to claim 16, wherein said plurality of electrically connecting terminals of said optical accessory are fixed in said optical accessory.

18. A camera comprising:
- a camera body having a mirror box, a plurality of electrically connecting terminals, and a mount having a lock member and a mount pawl thereon; and
- a bayonet-mount type optical accessory mountable on said camera body, wherein the optical accessory comprises:
  - a mount comprising a mount pawl engageable and disengageable by rotation around the optical axis with said mount pawl of said camera body;
  - a plurality of electrically connecting terminals arranged around, but below, an optical axis of said camera to engage said electrically connecting terminals of said camera body in the direction of the optical axis when said mount of said optical accessory rotates around the optical axis to engage with said mount of said camera body so that said plurality of electrically connecting terminals of said optical accessory are located below the optical axis when the engagement of both mounts is completed, and wherein connecting portions of said electrically connecting terminals of said optical accessory are positioned behind said mount pawl of said optical accessory in the direction of the optical axis, said plurality of electrically connecting terminals being spaced from an abutment surface of said optical accessory mount toward the optical axis and formed in a circumferential line with respect to the optical axis;
- said optical accessory mount including a receiving portion for receiving said camera mount lock member upon completion of coupling between said optical accessory electrically connecting terminals and said camera body electrically connecting terminals, said receiving portion being located substantially 90° around the optical axis from a central portion of said optical accessory connecting terminals, wherein said plurality of electrically connecting terminals are disposed at a position such that $\theta 1$ is greater than $\theta 2$, wherein $\theta 1$ is an angle between a counterclockwise-most terminal when said optical accessory is mounted on said camera body and a point P at which said camera mirror box intersects an inner curvature of the camera mount pawl, and where $\theta 2$ is an angle between the counterclockwise-most terminal before said optical accessory is rotated and after said optical accessory is rotated for mounting; and
- a terminal base member, wherein said plurality of electrically connecting terminals of said optical accessory are supported by said terminal base member, and wherein an end portion of said terminal base member is located behind said mount pawl of said optical accessory in the direction of the optical axis.

* * * * *

UNITED STATES PATENT AND TRADEMARK OFFICE
CERTIFICATE OF CORRECTION

PATENT NO. : 5,041,858

DATED : August 20, 1991

INVENTOR(S) : Masayoshi Yamamichi et al.

It is certified that error appears in the above-identified patent and that said Letters Patent is hereby corrected as shown below:

Title page:

At [56] References Cited:
OTHER PUBLICATIONS

Change "Pliot Argus" to --Phot Argus--.

COLUMN 1:
    Line 13, "camera." should read --a camera.--;
    Line 27, "lens, lens." should read --lens.-- and "example" should read --example,--; and
    Line 49, "for," should be deleted.

COLUMN 2:
    Line 44, "looked" should read --viewed--.

COLUMN 3:
    Line 46, "a" should be deleted.

UNITED STATES PATENT AND TRADEMARK OFFICE
CERTIFICATE OF CORRECTION

PATENT NO. : 5,041,858

DATED : August 20, 1991

INVENTOR(S) : Masayoshi Yamamichi et al.

It is certified that error appears in the above-identified patent and that said Letters Patent is hereby corrected as shown below:

COLUMN 4:
  Line 40, "the" (first occurrence) should be deleted; and
  Line 55, "slands" should read --stands--.

COLUMN 5:
  Line 16, "$\theta_1 > \theta_2$" should read --$\theta_1 > \theta_2$.--; and
  Line 37, "slands" should read --stands--.

COLUMN 8:
  Line 64, "claim 10" should read --claim 10,--.

Signed and Sealed this

Fourth Day of May, 1993

Attest:

MICHAEL K. KIRK

Attesting Officer

Acting Commissioner of Patents and Trademarks